United States Patent
Grycewicz

(10) Patent No.: US 8,306,274 B2
(45) Date of Patent: Nov. 6, 2012

(54) METHODS FOR ESTIMATING PEAK LOCATION ON A SAMPLED SURFACE WITH IMPROVED ACCURACY AND APPLICATIONS TO IMAGE CORRELATION AND REGISTRATION

(75) Inventor: Thomas J Grycewicz, Fairfax, VA (US)

(73) Assignee: The Aerospace Corporation, El Segundo, CA (US)

(*) Notice: Subject to any disclaimer, the term of this patent is extended or adjusted under 35 U.S.C. 154(b) by 351 days.

(21) Appl. No.: 12/787,289

(22) Filed: May 25, 2010

(65) Prior Publication Data

US 2011/0293146 A1 Dec. 1, 2011

(51) Int. Cl.
G06K 9/00 (2006.01)
G21K 1/02 (2006.01)

(52) U.S. Cl. ............ 382/106; 382/291; 250/363.01

(58) Field of Classification Search ......... 382/100, 382/103–108, 130, 154–155, 168, 173, 181, 382/209, 220, 232, 254, 274, 276, 291, 294, 382/305, 312; 348/576; 250/558, 363.01
See application file for complete search history.

(56) References Cited

U.S. PATENT DOCUMENTS

| | | | | |
|---|---|---|---|---|
| 3,595,995 A * | 7/1971 | Hobrough | ...... | 250/558 |
| 3,905,045 A * | 9/1975 | Nickel | ...... | 382/130 |
| 5,220,441 A | 6/1993 | Gerstenberger | | |
| 5,341,174 A * | 8/1994 | Xue et al. | ...... | 348/576 |
| 5,696,848 A | 12/1997 | Patti et al. | | |
| 5,920,657 A | 7/1999 | Bender et al. | | |
| 5,946,426 A | 8/1999 | Carlebarch | | |
| 6,023,535 A | 2/2000 | Aoki | | |
| 6,208,765 B1 | 3/2001 | Bergen | | |
| 6,320,611 B1 | 11/2001 | Pepin | | |
| 6,535,650 B1 | 3/2003 | Poulo et al. | | |
| 7,085,323 B2 | 8/2006 | Hong | | |
| 7,227,984 B2 | 6/2007 | Cavan | | |
| 7,352,919 B2 | 4/2008 | Zhou et al. | | |
| 7,358,474 B2 | 4/2008 | Flynn | | |
| 7,428,324 B2 | 9/2008 | Crandall et al. | | |
| 7,606,424 B2 * | 10/2009 | Rohaly | ...... | 382/209 |

(Continued)

FOREIGN PATENT DOCUMENTS

WO WO 2009026522 A1 2/2009

OTHER PUBLICATIONS

O'Neil, E.L., "Transfer Function for an Annular Aperture," *Journal of the Optical Society of America*, vol. 46, No. 4, pp. 285-288 (Apr. 1956).

(Continued)

*Primary Examiner* — Seyed Azarian
(74) *Attorney, Agent, or Firm* — Henricks, Slavin & Holmes LLP

(57) ABSTRACT

Methods and systems for estimating peak location on a sampled surface (e.g., a correlation surface generated from pixilated images) utilize one or more processing techniques to determine multiple peak location estimates for at least one sampled data set at a resolution smaller than the spacing of the data elements. Estimates selected from the multiple peak location estimates are combined (e.g., a group of estimates is combined by determining a weighted average of the estimates selected for the group) to provide one or more refined estimates. In example embodiments, multiple refined estimates are combined to provide an estimate of overall displacement (e.g., of an image or other sampled data representation of an object).

43 Claims, 6 Drawing Sheets

Correlation-based System for Image Flow Determination

U.S. PATENT DOCUMENTS

| | | | |
|---|---|---|---|
| 2007/0003165 A1* | 1/2007 | Sibiryakov et al. | 382/294 |
| 2007/0189637 A1 | 8/2007 | Rohaly | |
| 2008/0091678 A1 | 4/2008 | Walker et al. | |
| 2008/0212838 A1* | 9/2008 | Frigerio | 382/107 |
| 2009/0028423 A1 | 1/2009 | Sandstrom et al. | |
| 2009/0148051 A1 | 6/2009 | Pham et al. | |
| 2011/0115793 A1 | 5/2011 | Grycewicz | |
| 2012/0127331 A1 | 5/2012 | Grycewicz | |

OTHER PUBLICATIONS

Kim, S.P., et al., "Recursive Reconstruction of High Resolution Image From Noisy Undersampled Multiframes," *IEEE Trans Accoustics, Speech, and Signal Processing*, vol. 38, No. 6, pp. 1013-1027 (Jun. 1990).

Tom, B.C., et al., "Reconstruction of a high resolution image by simultaneous registration, restoration, and interpolation of low-resolution images," *Proceedings of the 1995 International Conference on Image Processing* (Date of Conference: Oct. 23-26, 1995).

Borman, S., et al., "Super-resolution from image sequences—A review," *Proc. 1998 Midwest Symp. Circuits and Systems*, pp. 374-378 (1999).

Hochman, G., et al., "Restoration of images captured by a staggered time delay and integration camera in the presence of mechanical vibrations," *Applied Optics*, vol. 43, No. 22, pp. 4345-4354 (Aug. 1, 2004).

Jacobsen, K., "High-Resolution Imaging Satellite Systems," 3D-Remote Sensing Workshop, Porto (2005), accessed at http://www.ipi.uni-hannover.de/uploads/tx_tkpublikationen/HRIjac.pdf.

Grycewicz, T.J., et al., "Joint transform optical correlation applied to sub-pixel image registration," *Proceedings of the SPIE*, vol. 5908, pp. 59080Z-1-59080Z-9 (Sep. 10, 2005).

Haik, O., et al., "Superresolution reconstruction of a video captured by a vibrated time delay and integration camera," *Journal of Electronic Imaging*, vol. 15(2), pp. 023006-1-023006-12 (Apr.-Jun. 2006, published online May 17, 2006).

Krashefski, B., et al., "A Versatile, Producible, Digital, FPA Architecture," *Proceedings of the SPIE*, vol. 6206, pp. 62062W-1-62082W-12 (May 18, 2006).

Ridgway, G.R., "Longitudinal MR Imaging of Dementia (Nine-month Report)," Centre for Medical Image Computing, University College London (Jun. 29, 2006).

Grycewicz, T.J., et al., Fourier plane and optical proceesing for sub-pixel image registration, *Proceedings of the SPIE*, vol. 6311, pp. 631117-1-631117-8 (Aug. 30, 2006).

Janschek, K., et al., "Performance Analysis for Visual Planetary Landing Navigation using Optical Flow and DEM Matching," *Proceedings of the AIAA Guidance, Navigation and Control Conference 2006*, Keystone, Colorado, Paper No. AIAA-2006-6706 (Date of Conference: Aug. 21-24, 2006).

Pickup, L.C., "Machine Learning in Multi-frame Image Super-resolution," Robotics Research Group, Department of Engineering Science, University of Oxford (2007).

Bodenstorfer, E., et al., "High-speed Line-Scan Camera with Digital Time Delay Integration," *Proceedings of the SPIE*, vol. 6496, pp. 64960I-1-64960I-10 Feb. 26, 2007).

Grycewicz, T.J., et al., "Estimation bias from using nonlinear Fourier plane correlators for sub-pixel image shift measurement and implications for the binary joint transform correlator," *Proceedings of the SPIE*, vol. 6695, pp. 66950J-1-66950J-11 (Sep. 20, 2007).

Krotosky S.J., et al., "On Color-,Infrared-, and Multimodal-Stereo Approaches to Pedestrian Detection," *IEEE Transactions on Intelligent Transportation Systems*, vol. 8 No. 2, pp. 619-629 (Dec. 2007).

Cota, S.A., et al., "PICASSO—An End-to-End Image Simulation Tool for Space and Airborne Imaging System," *Proceedings of the SPIE*, vol. 7087, pp. 708703-1-708703-31 (Aug. 25, 2008).

Grycewicz, T.J., et al., "Focal plane resolution and overlapped array TDI imaging," *Proceedings of the SPIE*, vol. 7087, pp. 708704-1-708704-12 (Aug. 25, 2008).

* cited by examiner

Generalized Correlator

System for Estimating Peak Location on a Sampled Surface

Smooth One-Dimensional Curve and Sampled Representation Thereof

Correlation-based System for Image Flow Determination

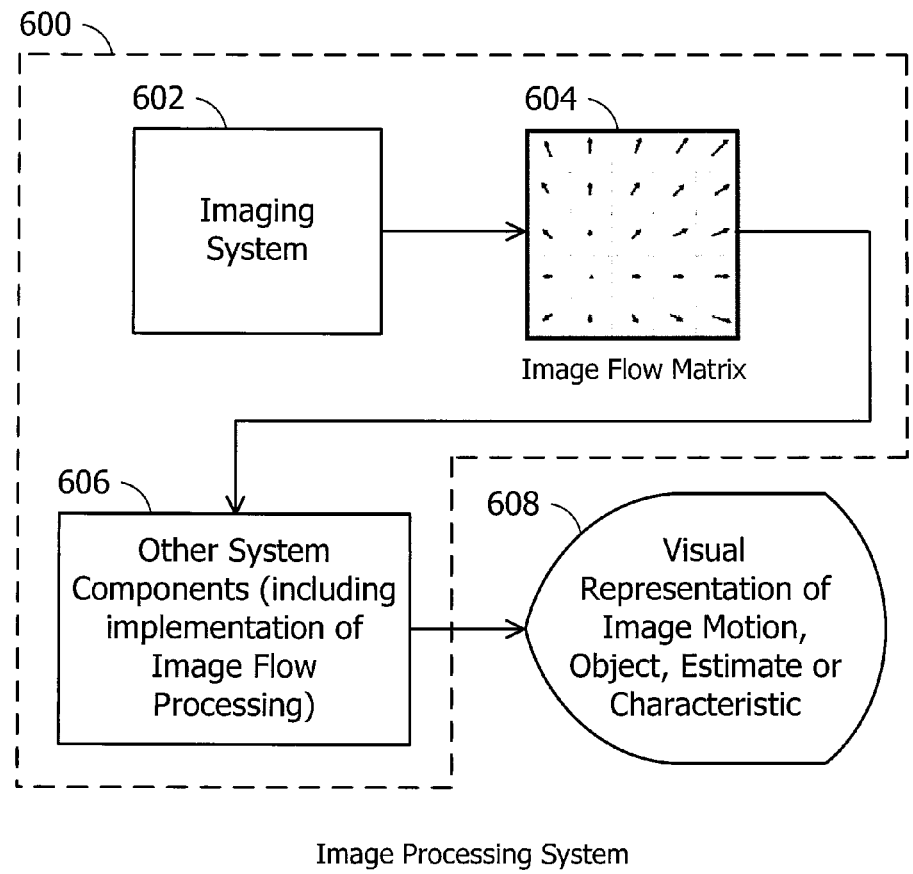
Image Processing System
FIG. 6
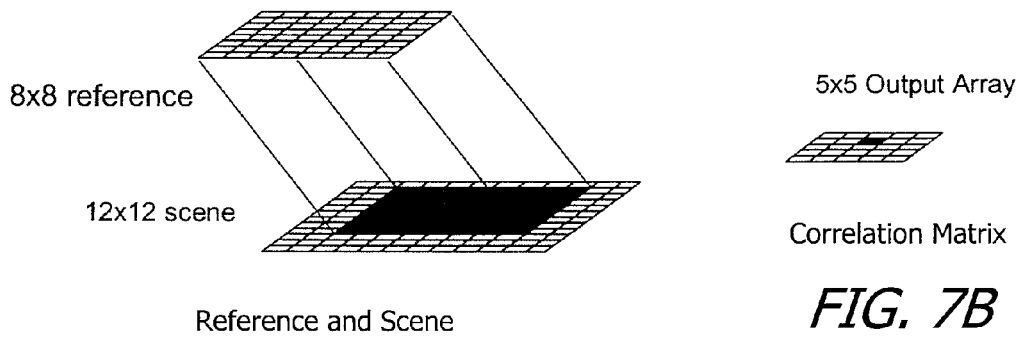
FIG. 7A — Reference and Scene
FIG. 7B — Correlation Matrix

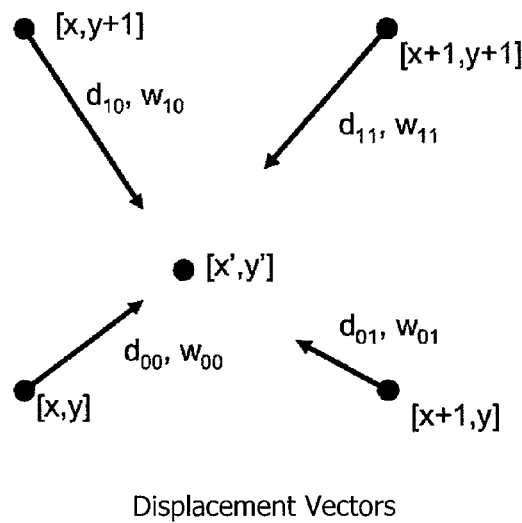
Displacement Vectors
*FIG. 8*
*FIG. 9A*
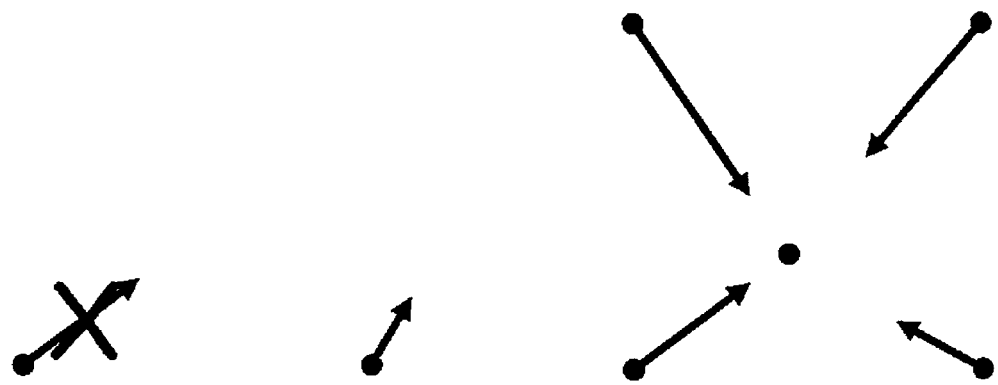
*FIG. 9B*  *FIG. 9C*

METHODS FOR ESTIMATING PEAK LOCATION ON A SAMPLED SURFACE WITH IMPROVED ACCURACY AND APPLICATIONS TO IMAGE CORRELATION AND REGISTRATION

TECHNICAL FIELD

The invention relates generally to image processing and, in particular, to a technique for estimating peak location on a sampled surface with improved accuracy and methods and systems that utilize the same.

BACKGROUND ART

Often when interpreting a set of sampled data points the goal is to find the precise location of the peak value of the underlying process with accuracy greater than that supported by the spacing of the sample points. One-dimensional examples of this include interpolation of measurements as in radar and sonar location algorithms. Two-dimensional applications include location of a target in a scene image by image correlation, estimation of an optical wave front in an adaptive optics (AO) sensor, determining the precise location of a star in an optical star tracker, and determining the precise registration offset between two images. FIG. 1 shows an example result of a single digital correlation (e.g., it describes the estimated displacement of a vibrated test pattern). The precise registration or offset between the underlying image objects is estimated by determining the location of the center of the correlation peak.

For many processes involving the overlay of multiple layers of image data, the first step is often to register the images to one another so that they share an x-y addressing space. Image registration is often accomplished at many small, evenly spaced regions, or templates. The result of this process forms an optical flow matrix, which maps the estimated translation for each template. This is a map of the translations needed to warp one image into the other (assuming that the registration estimates at each point are good ones). The optical flow methodology, e.g., utilizing a map of translations to warp one image into another, is particularly useful when the difference between the images is more complex than a simple translation (e.g., global estimate). Examples of where a global estimate alone is inadequate and an optical flow method is useful include estimating an affine transformation, estimating range information through parallax, and motion detection and estimation. In general, precise sub-pixel estimation of optical flow is more challenging than estimation of global offset because the regions across which the registration measurements are made are much smaller.

Two methods commonly used to estimate the inter-pixel location of the peak value on a curve or surface are centroiding and curve fitting. In centroiding, a weighted average of the sample values near the peak location is used to find the center-of-mass of the peak. In curve fitting, the data points near the peak are approximated by a mathematical curve or surface with a known center point. Hyperbolas, parabolas, and Gaussian peaks are common forms for this fitting, and a least squares estimation algorithm is commonly used to find the best match between the curve or surface parameters and the measured data.

These methods are subject to inaccuracies for a number of reasons. Chief among these are: the data is noisy; a limited number of points are used for the estimate; and the real-world signal is not a perfect match to the mathematical surface used for fitting. These inaccuracies give rise to estimation biases and offsets as described in Grycewicz, T. J., Florio, C. J., Franz, G. A., and Robinson, R. E., "Estimation bias from using nonlinear Fourier plane correlators for sub-pixel image shift measurement and implications for the binary joint transform correlator," Proc. SPIE 66950J (2007) and the references cited therein, which are incorporated herein by reference in their respective entireties.

When correlation-based processing is used to estimate the sub-pixel registration distance between two images, the result will include systematic sub-pixel biases. When the template is small (a few hundred pixels or fewer) a strong bias will be seen towards the trial location (toward an assessment that the template is perfectly aligned with the image, irrespective of actual alignment). For larger templates, the strongest bias is frequently toward the nearest perfect integer match to the actual sub-pixel displacement. These bias errors are unavoidable consequences of attempting to interpolate values on a correlation surface generated from pixilated images. The spatial quantization of the input image to a correlator and the pixellation in the correlation plane both place limits on the accuracy of interpolating the peak's location in the correlation plane. Moreover, the width and shape of the correlation peak can be a limiting factor to location interpolation. If the peak is either too large or too small for the area over which the peak center is being estimated, the result will show a systematic bias toward the center of the pixel. Although bias terms can be minimized or reduced by choosing an interpolation routine matched to the sharpness of the correlation peak, because correlation peak sharpness is determined by image content and can vary widely for typical images, such an interpolation process is difficult to implement and computationally expensive.

Image registration is the first step in many image processing processes such as change detection, motion estimation, jitter compensation, image mosaic stitching, image overlay processing, three-dimensional extraction from a series of two-dimensional images, pattern recognition, machine vision, and target detection/identification. Image registration techniques which can reliably register two images to the nearest pixel are well developed, but most techniques break down when sub-pixel accuracy is required. For correlation-based methods, the error usually manifests as an image dependent systematic bias of the registration measurement towards the nearest whole-pixel shift. However, for many tasks, such as analysis of polarimetric images and change detection, sub-pixel registration errors result in objectionable artifacts in the results.

It would be useful to be able to improve the accuracy of methods and systems for estimating peak location on a sampled surface. In image correlation applications, it would be useful to be able to improve correlation peak location accuracy. In registration applications, it would be useful to be able to decrease sub-pixel registration estimate errors caused by biases or artifacts from an interpolation process.

SUMMARY OF THE INVENTION

The methods and systems for estimating the peak location on any sampled surface described herein, in various example embodiments, can be implemented exclusively in software, or utilizing a computer or other processing device in conjunction with one or more recording devices and/or additional image processing systems, apparatuses, and the like. By way of example, a recording device (e.g., a camera or other imaging device) is configured to provide an input to a programmed computing device (e.g., a processor). In an example embodiment, the recording device is configured to capture a representation of an object and to provide a sampled data set, which can be one-dimensional, two-dimensional, or extended to a higher dimension. Additionally, by way of example, a programmed computing device can be configured to process multiple estimates of peak location to generate optical flow matrices, registration estimates, and other information that can be utilized by image processing systems, such as navigation and simulated vision systems, and in a variety of image processing procedures, including motion analysis and terrain elevation estimation.

The techniques described herein generally involve refining peak location or other estimates to sub-pixel accuracy (e.g., finding the center of a correlation peak to sub-pixel resolution). In various embodiments, multiple peak location estimates are determined, for example, at different locations or points on a sampled surface.

In various embodiments, a refined estimate is determined by combining multiple peak location estimates. In an example embodiment, estimates are combined by determining an average value of the estimates. In another example embodiment, the estimates are weighted. In still another example embodiment, the average value is a weighted average (e.g., a nonlinear weighted average).

In various embodiments, at least one sampled data set pertaining to one or more representations of an object is processed to determine a plurality of peak location estimates (and/or registration estimates). One or more processing techniques can be utilized in determining the estimates.

In various embodiments, one or more refined estimates are determined. For example, a single refined estimate can be determined by combining a particular group of estimates (e.g., a group of estimates is combined by determining an average value of the estimates selected for the group).

The techniques described herein for estimating peak location on a sampled surface with improved accuracy facilitate other imaging and image processing applications including, but not limited to, image correlation and registration.

In example embodiments, the methods and systems described herein provide refined image registration estimates by combining two or more registration estimates (e.g., generated with the same image and template). By way of example, a "nearest pixel" registration estimate is refined to a sub-pixel registration estimate.

In example embodiments, an estimate of overall displacement is determined by combining a plurality of refined estimates. By way of example, methods and systems described herein facilitate determining a registration distance or estimate for each tile, patch, or other image region and, additionally, determining a global registration by combining (e.g., averaging) the local registration values. In an example embodiment, the sub-pixel image registration estimation is based on a weighted average of the registration displacement measured from multiple points.

In an example embodiment, a method includes: utilizing a recording device to capture one or more representations of an object and to generate at least one sampled data set; processing the one or more representations of an object using one or more processing techniques to determine a plurality of peak location estimates for the at least one sampled data set; and combining a group of estimates selected from the peak location estimates to determine a refined peak location estimate; wherein combining the group of estimates selected from the peak location estimates includes determining a weighted average of the estimates selected, the weighted average being determined by assigning weights to the estimates before the estimates are combined, the weights being determined for each of the estimates depending upon the distance between the estimate and a point associated with the estimate, with the weights being larger for smaller distances.

In an example embodiment, an imaging method includes: utilizing a recording device to capture one or more representations of an object and to generate at least one sampled data set; processing the one or more representations of an object using one or more processing techniques to determine a plurality of registration estimates for the at least one sampled data set; and combining estimates selected from the registration estimates to determine one or more refined registration estimates; wherein a group of estimates is combined by determining a weighted average of the estimates selected for the group, the weighted average being determined by assigning weights to the estimates before the estimates are combined, the weights being determined for each of the estimates depending upon the distance between the estimate and a point associated with the estimate, with the weights being larger for smaller distances.

BRIEF DESCRIPTION OF THE DRAWINGS

FIG. 6 is a block diagram showing an example image processing system incorporating an imaging system according to the present invention;

FIG. 7A shows an example reference and scene;

FIG. 7B shows an example correlation matrix;

FIG. 8 illustrates example displacement vectors from four locations around a registration point used to determine a subpixel registration estimate;

FIGS. 9A-9C illustrate an example extension of the four-point algorithm to cover a larger sized region of pixels; and.

DISCLOSURE OF INVENTION

In example embodiments described herein, methods and systems for estimating peak location on a sampled surface generally involve combining multiple peak location estimates to derive a more accurate peak location estimate. One or more processing techniques are used to determine the peak location estimates. The processing techniques can, but do not necessarily, include different types of processes. In an example embodiment, the one or more processing techniques include a plurality of processing techniques at least two of which are different in type. For example, for separate estimates multiple techniques can be used. In an example embodiment, within a single estimate, the same type of technique is used for all of the data to be combined.

In an example embodiment, the one or more processing techniques include an interpolation technique. In an example embodiment, the one or more processing techniques include a centroiding technique. In an example embodiment, the one or more processing techniques include a curve fitting technique. In various embodiments, the one or more processing techniques include conventional algorithms, which are adapted or implemented as described herein.

In an example embodiment, at least one of the peak location estimates is determined using a correlation-based processing technique. In another example embodiment, at least one of the peak location estimates is determined using an area comparison technique. It should be understood that other types and implementations of processes for estimating peak location, not explicitly described herein, whether presently known or otherwise, are also contemplated as being within the scope of the present invention.

Figure 10:
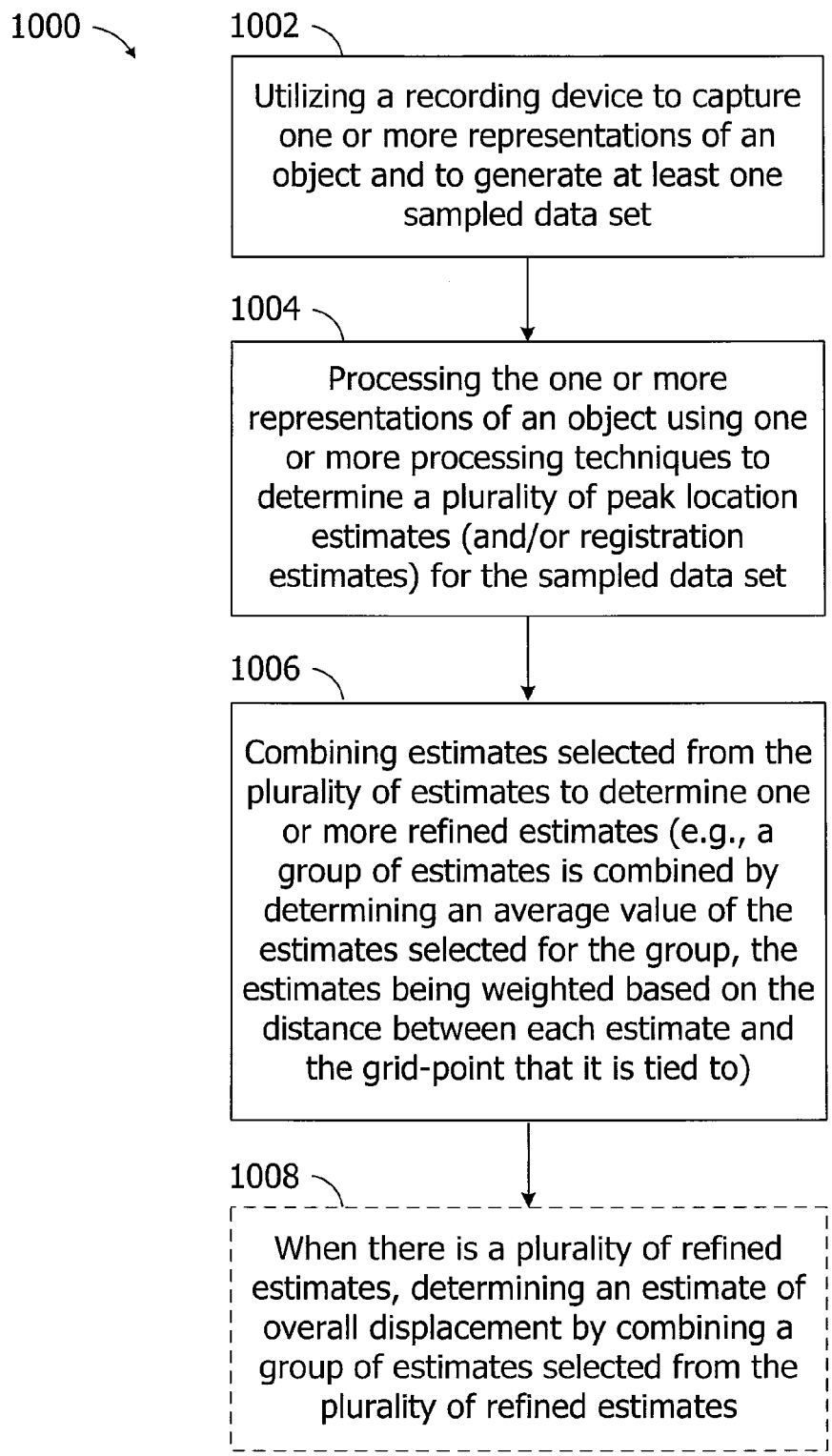
FIG. 10 is a flow diagram showing an example embodiment of a method for determining one or more refined estimates for a data set.

FIG. 10 is a flow diagram showing an example embodiment of a method 1000 for determining one or more refined estimates for a data set. At step 1002, a recording device (e.g., a camera) is utilized to capture one or more representations of an object and to generate at least one sampled data set. At step 1004, the one or more representations are processed using one or more processing techniques to determine a plurality of peak location estimates (and/or registration estimates) for the sampled data set. At step 1006, estimates selected from the plurality of estimates are combined to determine one or more refined estimates (e.g., a group of estimates is combined by determining an average value of the estimates selected for the group, the estimates being weighted based on the distance between each estimate and the grid-point that it is tied to). In other example embodiments, at step 1008 (which is optional and not required for all embodiments), an estimate of overall displacement is determined by combining a plurality of refined estimates.

In example embodiments, a process of combining a group of estimates selected from the registration estimates to determine one or more refined registration estimates includes determining a plurality of refined registration estimates for different regions of the sampled data set. In example embodiments, an estimate of overall displacement is determined by combining a group of estimates selected from the refined registration estimates. In example embodiments, a process of combining the group of estimates selected from the refined registration estimates includes determining an average value of the estimates selected. In other example embodiments, an optical flow matrix is generated from the refined registration estimates. In example embodiments, multiple sub-pixel estimates are combined.

Figure 1:
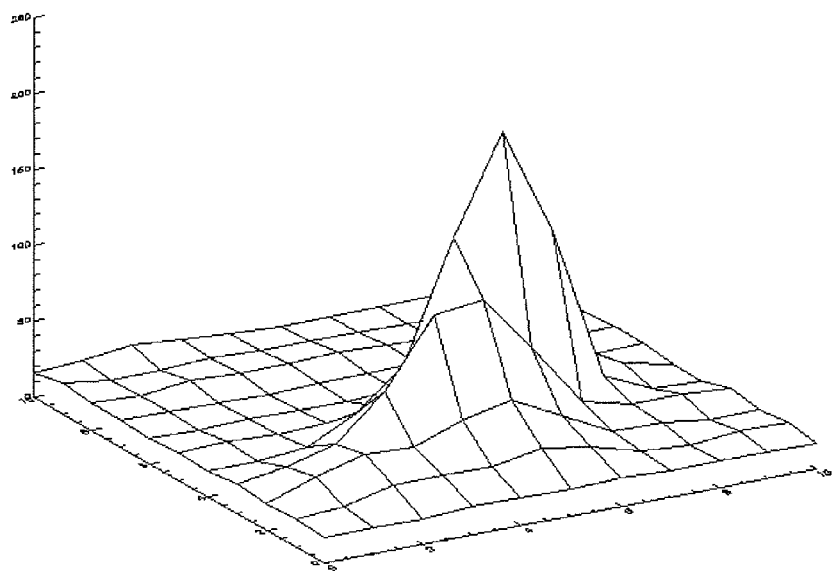
FIG. 1 shows an example result of a single digital correlation (e.g., it describes the estimated displacement of a vibrated test pattern)
Figure 2:
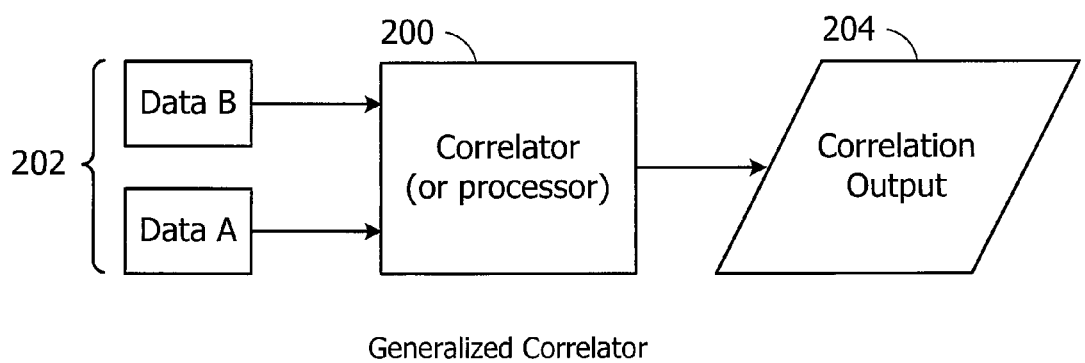
FIG. 2 illustrates a generalized correlator suitable for implementing the principles of the present invention.

Referring to FIG. 2, a generalized correlator (or processor) 200 suitable for implementing the principles of the present invention is now described. A sampled data set 202 (which includes, in this example, the data sets denoted "Data A" and "Data B", respectively) is provided to the correlator 200 which is configured to process the sampled data set 202 to generate a correlation output 204 according to the principles described herein. The correlator 200 can be configured (e.g., programmed) to implement a variety of different methods for determining a correlation or relationship between objects or data sets, such as a sampled data set (or sets) representing multiple image frames. Suitable correlation methods include, by way of example, local variance, correlations, peaks, symmetric and asymmetric forms of correlation, template-to-reference correlation, covariance, normalized correlation, or normalized covariance. Embodiments may further include any known statistical techniques and processes for determining a correlation between two sets of data.

Figure 3:
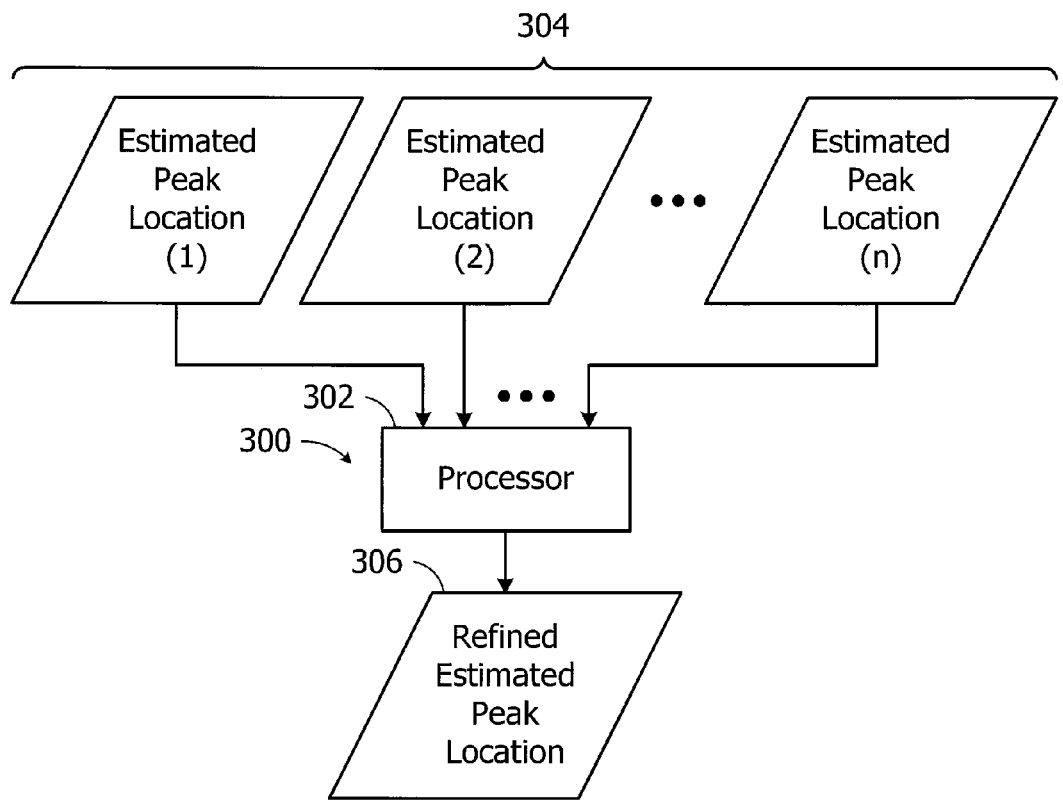
FIG. 3 is a block diagram showing an example embodiment of a system for estimating peak location (e.g., where the estimates are made in multiple sampled locations)

Referring to FIG. 3, in an example embodiment, a system 300 for estimating peak location on a sampled surface is implemented utilizing a processor 302 or other computing device, which is programmed to execute methods, processes, algorithms, or the like in accordance with the techniques described herein. In this example embodiment, a plurality of peak location estimates 304 (denoted, in this example, as "Estimated Peak Location (1)", "Estimated Peak Location (2)" . . . "Estimated Peak Location (n)", respectively) is provided to the processor 302 which is configured to process the peak location estimates 304 in accordance with the techniques described herein to generate a refined estimated peak location 306.

Figure 4:
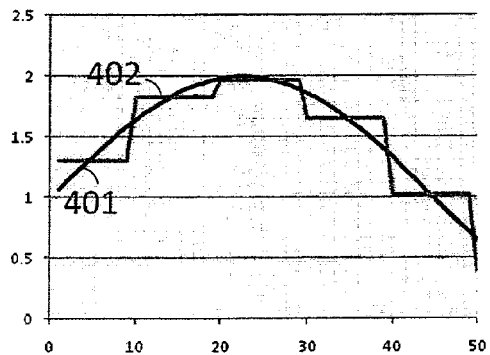
FIG. 4 shows an example of a smooth curve in one dimension and the result of sampling the same.

FIG. 4 illustrates some of the problems encountered when attempting to locate a peak on a sampled surface and is used to illustrate the utility of the techniques described herein in a one-dimensional example. In this example, the smooth curve 401 is a sinusoidal curve for which an estimate is to be made of the location of the peak based on the five values of the sampled curve 402. In this example, the actual center of the sinusoidal peak is known to be located at the position 22.44. The sampled curve 402 plots the value at five positions as the average value across the sample (in this example, each sample has a width of ten units). By comparing the values on the sampled curve, or by simple visual inspection, it can be seen that the peak center is closest to the third (the largest) sample. It is also evident that the peak falls between the centers of the second and third samples. (The second sample is larger than the fourth sample, and the first sample is larger than the fifth sample.) Conventional methods to find the center of the peak involve centroiding or curve fitting. Finding the centroid of the five samples results in a center estimate of 23.55, giving an error of 1.11. The centroid of the center three samples is 24.16, giving an error of 0.28. Curve fitting performs slightly better in this example. A best-fit parabola for all five values is centered at 22.63, giving an error of 0.19, and the best fit parabola to the center three is 22.51, giving an error of 0.07. When the techniques described herein are used, for example, to combine a centroid estimate based on the first three samples with a centroid estimate based on the center three samples the peak estimate is 22.47, giving an error of only 0.03. The techniques described herein have been utilized in numerous experiments with simulated data and known ground truth. Most of these experiments involved image registration. The accuracy improvement demonstrated in this example is typical of that seen in the experiments. The techniques described herein have also been applied to register sequences of images captured by cameras. While ground truth for the subpixel displacement was not available in these experiments, the registration results when the techniques described herein are applied were superior to those obtained with traditional processing.

In example embodiments, the techniques described herein are utilized to determine image displacement or registration (e.g., as between two images). In an example embodiment, a correlation-based system for estimating peak location on a sampled surface is implemented utilizing a processor or other computing device, which is programmed to execute methods, processes, algorithms, or the like in accordance with the techniques described herein. Referring again to FIG. 2, in an example embodiment, the input data are a pair of images (e.g., an input image and a reference image) and the processing implemented in the processor 200 includes an image correlation step that produces a sampled correlation surface as its output. In such an example embodiment, the processor 200 is configured to process the images in accordance with the techniques described herein to determine an image shift and/or other image motion or image object information. The processor 200 can be implemented utilizing a conventional digital image processing computer or an analog optical processing system. For example, a Joint Transform Correlator (JTC)) could be used for correlation.

In example embodiments of the methods and systems described herein, registration estimates are determined using correlation-based processing techniques.

In example embodiments of the methods and systems described herein, registration estimates are made at a plurality of different points on a sampled data set. By way of example, and as discussed below in greater detail, the different points are selected such that the points bracket an actual or expected offset.

Registration estimates can be made at points that bracket an actual displacement in one, two, or more dimensions. In an example embodiment, the registration estimates include two registration estimates that bracket the actual displacement in one dimension. For example, two (or more) measurements are made one pixel apart. In another example embodiment, the registration estimates include three or more registration estimates that bracket the actual displacement in two dimensions. For example, four registration estimates are made one pixel apart, forming corners of a square region one pixel in extent which brackets the actual displacement in two dimensions.

Iterative processing techniques can also be utilized to implement the techniques described herein. In example embodiments of the methods and systems described herein, the processing techniques include determining a subsequent registration estimate at a point on the sampled data set, the location of the point being determined based on one or more previous registration estimates. By way of example, one of the previous registration estimates is made from a known nearest neighbor location and used to determine the one-dimensional direction or two-dimensional quadrant for subsequent registration estimates.

Figure 5:
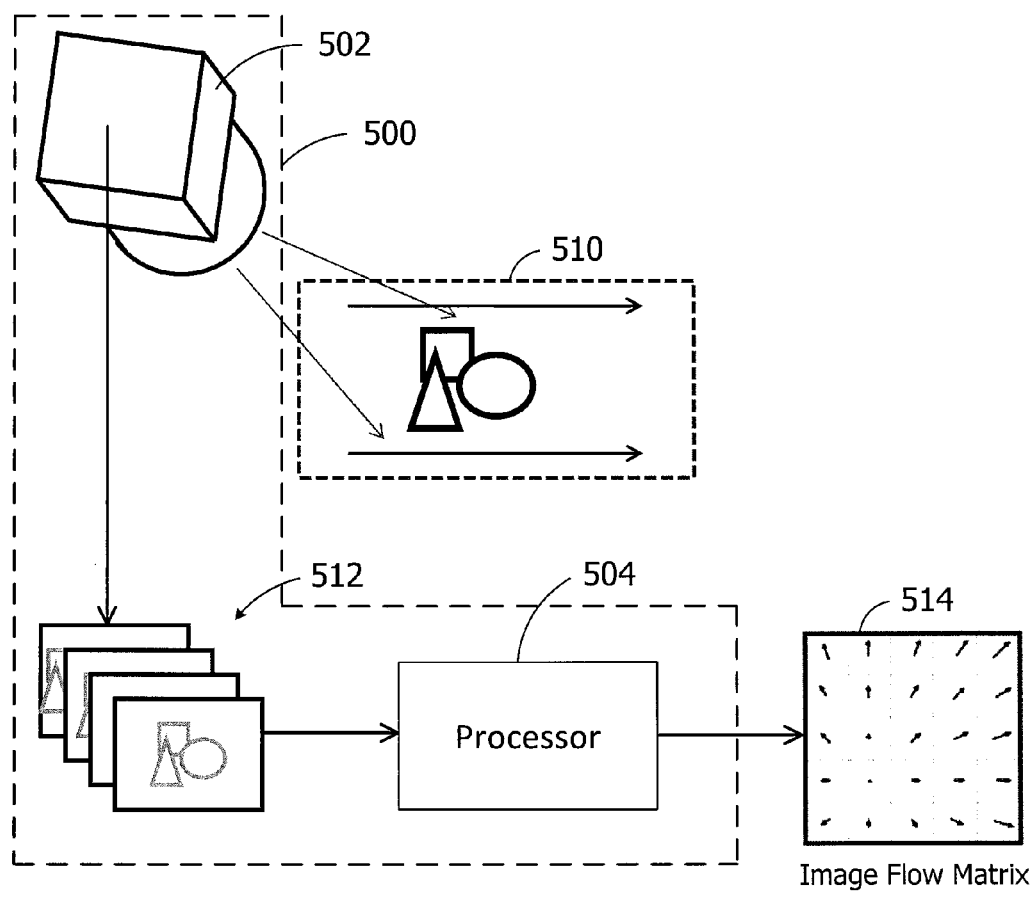
FIG. 5 is a block diagram showing an example embodiment of a correlation-based system for optical flow determination.

Optical flow matrices and other data useful for image processing and other applications can also be generated by example embodiments of the systems and methods described herein. Referring to FIG. 5, in an example embodiment, a correlation-based system 500 (denoted in dashed lines) for optical flow determination includes an imaging device 502 that is operative interconnected to a processor (or other computing device) 504. In an example embodiment, the imaging device 502 is a camera, sensor, or other recording device that is responsive to electromagnetic radiation in the visible, infrared, millimeter wave, terahertz, ultraviolet, x-ray, or gamma ray region of the spectrum. The imaging device 502 can be a staring array imager and, for example, include a focal plane array (FPA). By way of example, the imaging device 502 can be a charge-coupled device (CCD) array, an active-pixel imager, or a Complementary Metal-Oxide-Semiconductor (CMOS) array.

In an example embodiment, an imaging device 502 (such as a video camera) is used as an imager to provide an input to a processor (or other computing device) 504 that is programmed to generate an optical flow matrix. In this example, a scene 510 (denoted in dashed lines) to be imaged is shown in motion relative to the imaging device 502. Images 512 captured by the imaging device 502 (in the form of image data) are provided to the processor 504 as depicted. The processor 504 includes and/or has access to a memory device for storing data.

In an example embodiment, the processor 504 is configured to determine a plurality of –registration estimates for different regions of a sampled surface. In this example embodiment, the processor 504 is configured to generate an optical flow matrix 514 from the registration estimates.

The processor 504 can also be programmed to implement other and/or additional processing tasks, as described herein or elsewhere. The processing techniques described in the references referred to in the section entitled "Background Art", all of which are incorporated herein by reference, can be implemented as appropriate in providing software programs, modules, etc. to be executed by the processor 504. It should also be appreciated that the processing functionality provided by the processor 504 can be distributed among multiple computing devices and/or provided at least in part via a remote communications link. Other computing configurations can also be implemented.

In an example embodiment, the processor 504 is configured, e.g., with an optical correlator, to receive an input image as a modulating input for generating a correlation image. In an example embodiment, the processor 504 includes an optical correlator, e.g., a Joint Transform Optical Correlator module.

The imaging systems described herein can also be incorporated into and/or interfaced operationally with other systems. Referring to FIG. 6, in an example embodiment, an image processing system 600 (denoted in dashed lines) includes an imaging system 602 (such as the correlation-based system 500 previously described). In this example embodiment, the imaging system 602 is configured to generate an optical flow matrix 604, which is provided as an input to other system components 606 (e.g., an image processing device which is configured to implement optical flow processing). In an example embodiment, the other system components 606 include an optical flow processor. By way of example, the image processing device is part of a navigation system, a simulated vision system, or any other system that receives image flow information or data as an input.

In example embodiments, an optical flow matrix generated according to the techniques described herein is provided to an image processing device. In an example embodiment, the image processing device is configured to detect, estimate, and/or track the image motion. In another example embodiment, the image processing device is configured to detect, estimate the location of, or track an image object. In the example embodiment depicted, the image processing device (included among the other system components 606) is configured to analyze image motion associated with the sampled data set and generate a visual representation 608 of one or more of the following: the image motion, an image object, an image estimate, and an image characteristic.

Referring initially to FIGS. 7A and 7B, an example technique implementing the principles of the present invention is now described. In an example embodiment, the technique is implemented utilizing one or more computer-executable programs, algorithms, or the like. In this example embodiment, the technique uses image templates for registration matching, builds an optical flow matrix, and determines overall image correlation (or displacement). First, the images to be correlated are partitioned into tiles or image templates (as shown in FIG. 7A). In this illustrated example, 8×8 image templates are used for registration matching and to build an optical flow matrix, with measurements being taken every eight pixel. Image templates of other sizes, e.g., 4×4 or larger, can also be used.

In an example embodiment, an initial registration estimate is assumed to have established the peak location to within a pixel. A reference tile is now matched to the scene in a small area surrounding its expected location through a process of mathematical correlation. In this example embodiment, the correlation region is a 5×5 square extending two pixels beyond the initial estimate in each direction. The results of this correlation are used with the technique described below to form a refined estimate. In this embodiment, the refined estimate has been shown to be superior to simple estimates based on centroiding or fitting to a single curve as long as the actual registration is close to the initial estimate, e.g., within a pixel and a half. While this technique could be modified to span several pixels of misregistration, larger spans result in reduced accuracy and increased computation time.

The computation of local registration estimates in this manner facilitates building an optical flow map, which can be utilized by various image processing procedures such as motion analysis and terrain elevation estimation.

In example methods and systems described herein, a global registration estimate (or overall image displacement) is determined by combining two or more of the refined local registration estimates. For example, a global registration is determined by taking the average of the refined local registration values. Alternatively, the global registration estimate is determined by calculating the average value of, or by otherwise combining, some combination of refined local registration estimates and measurements.

In the following two sections, an example embodiment of an efficient and effective correlation-based process for estimating the peak displacement from a data location is described.

Calculation of the Refined Location Estimate

In example methods and systems described herein, one or more processing techniques are used to determine refined peak location estimates (and/or other refined estimates, such as refined registration estimates) for a sampled data set. Referring again to FIGS. 7A and 7B, the geometry for an example operation is shown.

As between a point location in a first image (e.g., reference image) and a nearest-neighbor point in a second image (e.g., the scene), in an example embodiment, it is initially assumed that a peak location (or offset between the images) is known to within a set of bounds (e.g., the actual peak location or registration offset lies within one pixel, or several pixels), and a refined (e.g., sub-pixel) location is to be determined within these bounds. Other initial areas can be selected.

Once the images are aligned to a nearest-neighbor relationship, e.g. the images are globally aligned such that the registration is known with an accuracy of one pixel or better, sub-regions are defined to use for correlation. Referring to FIG. 7A, in this example embodiment, an 8×8 reference is chosen from one image and a 12×12 scene from the other image (i.e., reference and scene patches are extracted from the two images). The two matrices are then correlated, resulting in a 5×5 correlation matrix or computed correlation surface (FIG. 7B).

Countering Edge Effects and Image Slope

In the examples described here, correlations are made between small areas of an image. These correlations are very prone to peak location bias resulting from local data content at the edge of the correlation region and to an overall slope to the data values. These biases can shift the location estimate by multiple pixels. While the techniques described herein to refine the subpixel estimate of a peak location or registration help to counter these effects, the techniques are limited to improving a valid location estimate, e.g., the initial estimate must be within a pixel of the actual peak location. Where edge effects or image slope create artifacts that shift the initial estimate of the correlation location by more than a pixel, any attempt to refine the estimate is likely to fail. The example correlation techniques described in the next several paragraphs have been used to reduce or eliminate the more common sources of bias in a peak location estimate, and have been used successfully in conjunction with the techniques described herein for refining the subpixel peak location estimate.

As can be seen in FIG. 7A, in this example embodiment, the scene matrix is larger than the reference image. The reference fully overlaps the scene when shifted two pixels in either direction. When the correlation surface is measured, it is often the case that the scene will generate a larger correlation signal with the pixels at one edge of the reference than the other, resulting in a (sometimes strong) bias to that direction. One example is where the scene pixel values generally ramp up from left to right. The further to the right the image is shifted, the larger the correlation value returned. This can be minimized through processing, for instance, by subtracting the mean value of the reference from the reference.

A technique which reduces this effect further is utilizing a bi-directional process: first compare a to b and then compare b to a; and then average the results. This works well and minimizes many artifacts. In an example embodiment, a bi-directional process which generates at least two peak location estimates starts with two 12×12 sub-images. In this example, the center 8×8 of the first is used to compute a correlation in one direction, and the center 8×8 of the second is used to compute a correlation in the other (opposite) direction. By subtracting the two results, common mode effects are eliminated and more accurate sub-pixel correlation estimates are generated. Other techniques frequently used to minimize the bias effects resulting from image slope rely on spatial high-pass filtering of the images or edge detection prior to correlation. These techniques are widely used and well established, and often result in a peak estimate that is within a pixel of the actual peak location and thus are compatible with this technique for subpixel refinement of the peak location estimate as described herein.

A similar problem is encountered when a dark-to-bright transition occurs just outside of the bounds of the reference, but within the scene bounds. This can result in a strong bias and may not be removable by the technique described above. To remedy this sort of measurement bias, an attempt can be made to detect invalid measurements and "throw out" (disregard) data for these points. Moreover, it has been observed that smaller biases will tend to average out. Because the bias is equally likely to pull a measurement in any direction, the effect will average to zero over a sufficiently large number of correlation points. Where a sharp transition just outside the reference template shifts the registration estimate, the effect is usually not small or subtle. Instead of being within a half pixel of the expected location, the registration estimate will frequently be at the edge of the correlation window. In an example embodiment, point estimates more than one pixel from the nearest neighbor are designated as invalid and thrown out. The 5×5 output array supports shift estimates of up to two pixels. However, output estimates greater than 1.5 pixels are considered to be unreliable and estimates greater than 1 pixel suspect because they are too close to the edge of the output array. In practice, eliminating points of questionable validity generally results in discarding fewer than twenty percent of the correlation points.

Edge effects are also reduced by correlating larger sub-images. This leads to a key system trade over the number and size of the correlation templates. They can overlap. They do not need to touch. A denser sampling grid provides better resolution for an image-flow matrix, if this is a goal of the processing. If a goal is to estimate the overall shift, sampling more points is an advantage in that it provides more estimates to average. In the example embodiment, a non-overlapping grid of 8×8 correlations is utilized.

Estimation Bias Effects on the Subpixel Peak Location Estimate

Correlation-based registration estimators tend to have a nonlinear sub-pixel response which results in underestimating the displacement to the nearest point where the images are aligned at an integral pixel displacement.

As described in Grycewicz, T. J., Florio, C. J., Franz, G. A., and Robinson, R. E., "Estimation bias from using nonlinear Fourier plane correlators for sub-pixel image shift measurement and implications for the binary joint transform correlator," *Proc. SPIE* 66950J (2007), the bias effect can be minimized by appropriate sizing of the estimation window, which involves making sure that the centroid estimation window is wide enough to capture the entire correlation peak, but not so wide to capture an excessive amount of noise.

In relation to the subject disclosure, the correlation peaks observed usually had a half-width of more than seven pixels, and therefore estimating the center across a window with width eleven or more pixels provided better results than a five pixel-wide correlation window. However, a larger window has three drawbacks. First, a wider window is computationally more expensive. More points are calculated for the correlation surface. Second, a larger correlation window eliminates systematic bias at the expense of increased random noise. Third, the width of the optimum correlation peak, and the width of the optimum centroid estimation window depend on the image content. Images with smooth surfaces devoid of high-resolution detail have smooth wide correlation peaks. Images with a large amount of high-contrast, high-resolution detail have narrow correlation peaks.

The techniques described in the following section have been tested with a wide variety of images and observed to eliminate most of the systematic bias from the sub-pixel registration estimate.

Countering Estimation Bias Through Weighted Averaging of Points

In example methods and systems described herein, estimates (such as peak location estimates) at two or more trial points are combined to generate a refined estimate by determining a nonlinear weighted average of the estimates. (It should be understood that the scope of the present invention additionally contemplates methods and systems in which estimates are combined to generate a refined estimate by determining a linear weighted average of the estimates. However, for peak estimates based on centroids, linear averaging does not appear to provide an improvement over conventional techniques.)

For a two-dimensional sampled surface, the refined estimate is determined by combining three or more estimates. In the case of a two-dimensional image, in an example embodiment, the refined estimate is determined by three or more correlation estimates (e.g., four correlation estimates) centered at boundary locations of an image region (e.g., centered at the corners of the peak pixel) all based on a single wide-area correlation surface. Alternatively, for a two-dimensional image, the trial points can be the four corners (or three of the four corners) of a "unit square" enclosing a sub-pixel estimate (e.g., a sub-pixel registration estimate).

In example methods and systems described herein, a computationally efficient four-point algorithm is utilized to estimate sub-pixel displacement based on the correlation of small templates from two input images. For each template match, the sub-pixel registration is determined by combining four correlation measurements (or estimates), one centered at each corner of the pixel or other image area containing the expected registration match. In example embodiments, a nonlinear combination of these measurements (or estimates) provides a very robust and accurate sub-pixel estimate of the registration offset. If all four point estimates at the corners of a pixel or other image area are not valid, an estimate can be made with the remaining three.

In an example embodiment, when the nearest neighbor location is known, a quadrant for the offset is determined in order to localize the estimate to a single pixel. Once the registration offset is determined to lie within a pixel, correlation techniques are applied to estimate the sub-pixel offset from each of the corners of the pixel. The sub-pixel component of the correlation location is estimated with a nonlinear weighted average of these sub-pixel offset measurements. The weights are selected to give a larger weight for a smaller distance estimate. This technique, which as previously discussed is also applicable in one-dimension, has been observed to greatly suppress bias artifacts and results in much more accurate sub-pixel registration estimates than conventional correlation techniques.

With respect to weighting criteria, in example embodiments, the weights assigned to the estimates are a function of the distance (or displacement) between the estimate and a point associated with the estimate (e.g., a grid-point that the estimate is tied to), with the weights being larger for smaller distances. In an example embodiment, the weight determined for an estimate increases as the estimate gets closer to the point associated with the estimate. In an example embodiment, the weight determined for an estimate increases at an increasing rate (e.g., at a rate faster than linear) as the distance decreases.

FIG. 8 illustrates example displacement vectors from four locations around a registration point used to determine a subpixel registration estimate. The initial peak location estimate is chosen at the point with the largest value on the correlation surface or other data matrix on which a peak location is being estimated. Based on the surrounding values, one of the four unit squares which meet at this point is selected as the unit square within which the peak is located. At each corner of this unit square, a small region of the correlation surface about the corner point is used to estimate the sub-pixel location of the peak center. The size chosen for this region is, for example, three pixels by three pixels or five pixels by five pixels in extent. Based on the data values in this region, the peak location is estimated at subpixel resolution. This estimation can use curve fitting or other methods to estimate the peak location. The four corner points, and therefore the four data regions are shifted from one another by one pixel. As a result, at least four data points (those at the four corners) will be common to all of the displacement estimates; each estimate will contain data points shared with some, but not all, of the other estimates; and each region will contain one data point which is not common to any of the other estimates.

In an example embodiment, the four-point algorithm calculates a sub-pixel registration estimate relating the points [x,y] and [x',y'] based on a weighted average of the displacements measured from the four corners of the pixel containing the registration point. The displacement vectors $d_{00}$, $d_{01}$, $d_{10}$, and $d_{11}$ are the measured displacements from the four corners of the pixel in one image to the location corresponding to the lower left corner of the pixel in the other image. The weights $w_{00}$, $w_{01}$, $w_{10}$, and $w_{11}$ are used to weight the displacements when calculating the registration estimate.

In an example embodiment, the process of calculating the weights starts with estimating the magnitude of the displacements and using these estimates to set intermediate weights. The intermediate weights are then normalized for the final set. The x and y components of the displacement are computed separately. A minimum value for the displacements is established, to avoid a computational singularity in determining the weights which will occur if a displacement of zero is used. The approximate displacement amplitudes used are $$d'_{00x} = \max\{d_{00x}, 0.00001\},$$

$$d'_{00y} = \max\{d_{00y}, 0.00001\},$$

$$d'_{01x} = \max\{d_{01x}, 0.00001\},$$

$$d'_{01y} = \max\{d_{01y}, 0.00001\},$$

$$d'_{10x} = \max\{d_{10x}, 0.00001\},$$

$$d'_{10y} = \max\{d_{10y}, 0.00001\},$$

$$d'_{11x} = \max\{d_{11x}, 0.00001\},$$

$$d'_{11y} = \max\{d_{11y}, 0.00001\},$$

where $d_{00x}$ is the x component of $d_{00}$, etc., and the minimum distance used is 0.00001 pixel. These approximate amplitudes set the initial weights:

$$w'_{00x} = 1/d'_{00x},$$

$$w'_{00y} = 1/d'_{00y},$$

$$w'_{01x} = 1/d'_{01x},$$

$$w'_{01y} = 1/d'_{01y},$$

$$w'_{10x} = 1/d'_{10x},$$

$$w'_{10y} = 1/d'_{10y},$$

$$w'_{11x} = 1/d'_{11x},$$

$$w'_{11y} = 1/d'_{11y},$$

This establishes a set of nonlinear weights based on the estimated displacement between the peak and each corner pixel. Other weighting functions are possible, but should have the property that more weight is assigned to smaller displacement estimates. The sum of the intermediate weights is used for normalization:

$$w_x = w'_{00x} + w'_{01x} + w'_{10x} + w'_{11x},$$

$$w_y = w'_{00y} + w'_{01y} + w'_{10y} + w'_{11y},$$

The final weights are determined by normalizing the intermediate weights:

$$w_{00x} = w'_{00x}/w_x,$$

$$w_{00y} = w'_{00y}/w_y,$$

$$w_{01x} = w'_{01x}/w_x,$$

$$w_{01y} = w'_{01y}/w_y,$$

$$w_{10x} = w'_{10x}/w_x,$$

$$w_{10y} = w'_{10y}/w_y,$$

$$w_{11x} = w'_{11x}/w_x,$$

$$w_{11y} = w'_{11y}/w_y,$$

The sub-pixel displacement estimate is calculated as the weighted sum of displacement measurements, $$d = d_{00}w_{00} + ([0,1] + d_{01})w_{01} + ([1,0] + d_{10})w_{10} + ([1,1] + d_{11})w_{11},$$

where the x,y notation has been reassembled and multiplication is element-wise, i.e., $$d_{00}w_{00} = [d_{00x}w_{00x}, d_{00y}w_{00y}] \text{ etc.}$$

Using test images and realistic system assumptions, the accuracy (the standard deviation of the error) for the four-point registration estimates has been observed to be of order 1/20 pixel or better. This is a factor of three to four better than is achieved using current conventional correlation-based approaches.

The following section describes a technique for extending the method for estimating a refined peak location within a known pixel to estimating a refined peak location within a multi-pixel region.

Extension from Estimation Within a Pixel to a 2×2 Pixel Region

When the nearest-neighbor point is known but the registration is not localized to within a single pixel (a common situation), a method for estimating the registration within a 2×2 (or larger sized) window is needed. In an example embodiment, an approach to finding the registration estimate when the initial estimate is not bounded by a single pixel is to start by using correlation, possibly over a much larger sub-region, to localize the registration to within a single pixel region and then proceed as described in the previous section. This works well, but is computationally intense.

In another example embodiment, the technique described in the previous section is applied on the 2×2 (or larger sized) region as a means of down-selecting to a 1×1 region. This is even more computationally intense, and generally does not work as well. As with using simple correlation to select the pixel within which the true correlation is expected, a larger scene and template is appropriate when working with a 2×2 or larger region than when working with a 1×1 region. The bias factors expected when estimating a sub-pixel displacement are different from the effects expected when the correlation distance is over a pixel. For this reason, an initial estimate with a span of more than a pixel should be treated as just that—an initial estimate. The technique described in the previous section should still be applied within a single pixel to achieve the final estimate.

In a third example embodiment, a technique generally involves starting at a pre-identified nearest neighbor location and applying a logic step after each correlation operation until either the single pixel region is located and bounded on all four corners or the computation is abandoned as possibly invalid.

The first step is to apply correlation at the point expected to be the nearest neighbor. This will produce a registration estimate with a magnitude and direction. The direction can be used at this point to select a quadrant with the initial point as a corner for final processing, or the logic process can be carried farther. A two-stage quadrant selection process starts by choosing whether the x or y component of the initial estimate is larger. The larger component determines the next point chosen as a candidate as corner of the pixel within which correlation is expected. The process is illustrated in FIGS. 9A-9C.

The axis with the larger component of the initial correlation estimate is chosen for the second corner of the expected sub-pixel region and correlation is performed at this point (in FIG. 9A, the point from which a displacement vector extends). In this example, it is assumed that the largest component is in the x direction. Moving one pixel along x, the correlation process is repeated. If the new measurement has an x component which points back to the initial estimate, then the estimate is bounded in x, and two points are accepted as the first two bounds which will be used to make a final registration estimate. If the second estimate points away from the initial estimate in x (as shown in FIG. 9B), either the initial estimate is abandoned, starting again from the second point, or the starting point is declared invalid. Once two corners are chosen, the average y estimate from these points is used to choose the next two points to close the square or other region (as shown in FIG. 9C). This technique provides four estimates for the sub-pixel process with only four correlations. It should be understood that logic operations and/or other decisional processes can be utilized and implemented in various ways to choose the appropriate quadrant.

Example applications for the techniques for estimating peak location on a sampled surface described herein include: estimation of the sub-pixel registration distance between two images or sub-images, as well as various image processing/analysis applications such as (super-resolution) image enhancement, image fusion, satellite imaging, image change analysis, polarimetric imaging, image overlay and stitching, image-based wavefront estimation (used in adaptive optics), machine vision, and other tasks which are based on point-by-point comparison between two images. As applied to data fusion, image registration is a key technology for the medical industry and the scientific community. As applied to image enhancement, the user base expands to include the entertainment industry and high-end amateur video photographers. A high-performance, low-computation registration algorithm could enable affordable frame-to-frame processing for improving the quality of video conversion from older formats to high-definition.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A method comprising:
utilizing a recording device to capture one or more representations of an object and to generate at least one sampled data set;
processing the one or more representations of an object using one or more processing techniques to determine a plurality of peak location estimates for the at least one sampled data set; and
combining a group of estimates selected from the peak location estimates to determine a refined peak location estimate;
wherein combining the group of estimates selected from the peak location estimates includes determining a weighted average of the estimates selected, the weighted average being determined by assigning weights to the estimates before the estimates are combined, the weights being determined for each of the estimates depending upon the distance between the estimate and a point associated with the estimate, with the weights being larger for smaller distances.

2. The method of claim 1, wherein the weighted average is a nonlinear weighted average in which the weight determined for an estimate increases at an increasing rate as the distance decreases.

3. The method of claim 1, wherein the recording device is a camera.

4. The method of claim 1, wherein the one or more representations of an object include one or more images, and the at least one sampled data set includes a correlation output.

5. The method of claim 1, wherein the object includes a sampled surface.

6. The method of claim 1, wherein the peak location estimates are determined at different locations of the sampled data set.

7. The method of claim 6, wherein the different locations bracket an actual or expected offset.

8. The method of claim 6, wherein the peak location estimates include two peak location estimates that bracket the actual displacement in one dimension.

9. The method of claim 8, wherein the two peak location estimates are made one pixel apart.

10. The method of claim 6, wherein the peak location estimates include three or more peak location estimates that bracket the actual displacement in two dimensions.

11. The method of claim 10, wherein the three or more peak location estimates are made one pixel apart, forming the corners of a region one pixel in extent which brackets the actual displacement in two dimensions.

12. The method of claim 1, wherein processing the one or more representations of an object using one or more processing techniques includes determining a subsequent peak location estimate at a point on the sampled data set, the location of the point being determined based on one or more previous peak location estimates.

13. The method of claim 12, wherein one of the previous peak location estimates is made from a known nearest neighbor location and used to determine the one-dimensional direction or two-dimensional quadrant for subsequent peak location estimates.

14. The method of claim 1, wherein a correlation-based processing technique is utilized to generate the at least one sampled data set.

15. The method of claim 14, wherein the correlation-based processing technique is a bi-directional process.

16. The method of claim 1, wherein the one or more processing techniques include a centroiding technique.

17. The method of claim 1, wherein the one or more processing techniques include a curve fitting technique.

18. The method of claim 1, wherein processing the one or more representations of an object using one or more processing techniques includes performing a correlation operation to form a correlation surface and performing a plurality of processes based on the correlation surface to estimate peak location offsets at a plurality of points on the correlation surface.

19. The method of claim 1, wherein combining a group of estimates selected from the peak location estimates to determine one or more refined peak location estimates includes determining a plurality of refined peak location estimates for different regions of the sampled data set.

20. The method of claim 19, further comprising:
determining an estimate of overall displacement by combining a group of estimates selected from the refined peak location estimates.

21. The method of claim 20, wherein combining the group of estimates selected from the refined peak location estimates includes determining an average value of the estimates selected.

22. An imaging method comprising:
utilizing a recording device to capture one or more representations of an object and to generate at least one sampled data set;
processing the one or more representations of an object using one or more processing techniques to determine a plurality of registration estimates for the at least one sampled data set; and combining estimates selected from the registration estimates to determine one or more refined registration estimates;

wherein a group of estimates is combined by determining a weighted average of the estimates selected for the group, the weighted average being determined by assigning weights to the estimates before the estimates are combined, the weights being determined for each of the estimates depending upon the distance between the estimate and a point associated with the estimate, with the weights being larger for smaller distances.

23. The imaging method of claim 22, wherein the weighted average is a nonlinear weighted average in which the weight determined for an estimate increases at an increasing rate as the distance decreases.

24. The imaging method of claim 22, wherein the registration estimates are made at a plurality of different points on the sampled data set.

25. The imaging method of claim 24, wherein the plurality of different points bracket an actual or expected offset.

26. The imaging method of claim 24, wherein the registration estimates include two registration estimates that bracket the actual displacement in one dimension.

27. The imaging method of claim 26, wherein the two registration estimates are made one pixel apart.

28. The imaging method of claim 24, wherein the registration estimates include three or more registration estimates that bracket the actual displacement in two dimensions.

29. The imaging method of claim 28, wherein the three or more registration estimates are made one pixel apart, forming the corners of a region one pixel in extent which brackets the actual displacement in two dimensions.

30. The imaging method of claim 22, wherein processing the one or more representations of an object using one or more processing techniques includes determining a subsequent registration estimate at a point on the sampled data set, the location of the point being determined based on one or more previous registration estimates.

31. The imaging method of claim 30, wherein one of the previous registration estimates is made from a known nearest neighbor location and used to determine the one-dimensional direction or two-dimensional quadrant for subsequent registration estimates.

32. The imaging method of claim 22, wherein a correlation-based processing technique is utilized to generate at least one of the registration estimates.

33. The imaging method of claim 32, wherein the correlation-based processing technique is a bi-directional process, which generates at least two of the registration estimates.

34. The imaging method of claim 22, wherein the one or more processing techniques include a centroiding technique.

35. The imaging method of claim 22, wherein the one or more processing techniques include a curve fitting technique.

36. The imaging method of claim 22, wherein processing the one or more representations of an object using one or more processing techniques includes performing a single correlation operation to form a correlation surface and performing a plurality of processes based on the correlation surface to estimate registration offsets at a plurality of points on the correlation surface.

37. The imaging method of claim 22, wherein combining a group of estimates selected from the registration estimates to determine one or more refined registration estimates includes determining a plurality of refined registration estimates for different regions of the sampled data set.

38. The imaging method of claim 37, further comprising:
determining an estimate of overall displacement by combining a group of estimates selected from the refined registration estimates.

39. The imaging method of claim 38, wherein combining the group of estimates selected from the refined registration estimates includes determining an average value of the estimates selected.

40. The imaging method of claim 37, further comprising:
generating an optical flow matrix from the refined registration estimates.

41. The imaging method of claim 40, further comprising:
providing the optical flow matrix to an image processing device; and using the image processing device to analyze image motion associated with the sampled data set and generate a visual representation of the image motion.

42. The imaging method of claim 41, wherein the image processing device is configured to detect, estimate, or track the image motion.

43. The imaging method of claim 42, wherein the image processing device is configured to detect, estimate the location of, or track an image object.

* * * * *